US009958926B2

(12) United States Patent
Puthiyedath et al.

(10) Patent No.: US 9,958,926 B2
(45) Date of Patent: May 1, 2018

(54) METHOD AND SYSTEM FOR PROVIDING INSTANT RESPONSES TO SLEEP STATE TRANSITIONS WITH NON-VOLATILE RANDOM ACCESS MEMORY

(75) Inventors: Leena K. Puthiyedath, Beaverton, OR (US); Raj K. Ramanujan, Federal Way, WA (US); Michael Rothman, Puyallup, WA (US); Blaise Fanning, Folsom, CA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 330 days.

(21) Appl. No.: 13/976,903

(22) PCT Filed: Dec. 13, 2011

(86) PCT No.: PCT/US2011/064687
§ 371 (c)(1),
(2), (4) Date: Jun. 27, 2013

(87) PCT Pub. No.: WO2013/089686
PCT Pub. Date: Jun. 20, 2013

(65) Prior Publication Data
US 2013/0283079 A1    Oct. 24, 2013

(51) Int. Cl.
*G06F 1/32* (2006.01)
(52) U.S. Cl.
CPC .......... *G06F 1/3234* (2013.01); *G06F 1/3275* (2013.01); *Y02B 60/1225* (2013.01); *Y02B 60/1228* (2013.01)
(58) Field of Classification Search
CPC ........ G06F 1/3202; G06F 1/3231; G06F 1/26; G06F 1/206; G06F 1/3228; G06F 1/08;
(Continued)

(56) References Cited

U.S. PATENT DOCUMENTS 5,710,930 A * 1/1998 Laney ................. G06F 9/4418
710/10
5,912,839 A 6/1999 Ovshinsky et al.
(Continued)

FOREIGN PATENT DOCUMENTS

CN        101599023 A    12/2009

OTHER PUBLICATIONS

International Preliminary Report on Patentability for International Application No. PCT/US2011/064687, dated Jun. 26, 2014, 6 pages.
(Continued)

*Primary Examiner* — Zahid Choudhury
(74) *Attorney, Agent, or Firm* — Compass IP Law PC

(57) ABSTRACT

A non-volatile random access memory (NVRAM) is used in a computer system to provide instant responses to sleep state transitions. The computer system includes a processor coupled to an NVRAM, which is accessible by the processor without passing through an I/O subsystem. The NVRAM is byte-rewritable and byte-erasable by the processor. In response to a request to enter a powered sleep state, the computer system converts the powered sleep state into a powered-off sleep state with system memory context stored in the NVRAM. The powered sleep state is defined as a state in which power is supplied to volatile random access memory in the computer system, and the powered-off sleep state is defined as a state in which power is removed from the volatile random access memory. In response to a wake event, the computer system resumes working state operations using the system memory context stored in the NVRAM.

20 Claims, 7 Drawing Sheets

(58) Field of Classification Search
CPC ........ G06F 12/12; G06F 1/3289; G06F 1/266; H04L 12/10

See application file for complete search history.

(56) References Cited

U.S. PATENT DOCUMENTS

| | | | |
|---|---|---|---|
| 7,590,918 | B2 | 9/2009 | Parkinson |
| 7,600,078 | B1 | 10/2009 | Cen et al. |
| 7,756,053 | B2 | 7/2010 | Thomas et al. |
| 7,913,147 | B2 | 3/2011 | Swaminathan et al. |
| 8,051,253 | B2 | 11/2011 | Okin et al. |
| 8,462,537 | B2 | 6/2013 | Karpov et al. |
| 8,462,577 | B2 | 6/2013 | Zeng et al. |
| 8,463,948 | B1 | 6/2013 | Qawami et al. |
| 8,612,676 | B2 | 6/2013 | Dahlen et al. |
| 8,499,174 | B2 | 7/2013 | Lai et al. |
| 8,605,531 | B2 | 12/2013 | Kau et al. |
| 8,607,089 | B2 | 12/2013 | Qawami et al. |
| 8,612,809 | B2 | 12/2013 | Casper et al. |
| 8,649,212 | B2 | 2/2014 | Kau et al. |
| 8,838,935 | B2 | 9/2014 | Hinton |
| 8,856,423 | B1* | 10/2014 | Sutardja ........................ 711/103 |
| 2002/0103984 | A1* | 8/2002 | Yamashima .................. 711/165 |
| 2007/0005922 | A1 | 1/2007 | Swaninathan et al. |
| 2007/0234028 | A1* | 10/2007 | Rothman et al. .................. 713/1 |
| 2008/0016269 | A1 | 1/2008 | Chow et al. |
| 2008/0034148 | A1 | 2/2008 | Gower |
| 2008/0065845 | A1 | 3/2008 | Montero et al. |
| 2008/0082752 | A1* | 4/2008 | Chary et al. .................. 711/118 |
| 2008/0082766 | A1 | 4/2008 | Okin et al. |
| 2008/0157050 | A1* | 7/2008 | Chen .................. G11C 11/5678 257/2 |
| 2008/0270811 | A1 | 10/2008 | Chow et al. |
| 2009/0172439 | A1* | 7/2009 | Cooper ................. G06F 1/3203 713/323 |
| 2009/0313416 | A1 | 12/2009 | Nation |
| 2010/0017637 | A1 | 1/2010 | Rosay |
| 2010/0058007 | A1 | 3/2010 | Yamauchi |
| 2010/0064159 | A1 | 3/2010 | Wu et al. |
| 2010/0095143 | A1* | 4/2010 | Yamaji .......................... 713/323 |
| 2010/0131827 | A1 | 5/2010 | Sokolov |
| 2010/0211743 | A1* | 8/2010 | Hara .................. G06F 12/0866 711/119 |
| 2010/0291867 | A1 | 11/2010 | Abdulla et al. |
| 2010/0293317 | A1 | 11/2010 | Confalonieri et al. |
| 2010/0306446 | A1 | 12/2010 | Villa et al. |
| 2010/0306453 | A1 | 12/2010 | Doller |
| 2010/0318718 | A1 | 12/2010 | Eilert et al. |
| 2011/0153916 | A1 | 6/2011 | Chinnaswamy et al. |
| 2011/0185208 | A1 | 7/2011 | Iwamoto et al. |
| 2011/0208900 | A1 | 8/2011 | Schuette et al. |
| 2011/0291884 | A1 | 12/2011 | Oh et al. |
| 2013/0275661 | A1* | 10/2013 | Zimmer et al. ............... 711/103 |
| 2013/0282967 | A1 | 10/2013 | Ramanujan |
| 2013/0290759 | A1* | 10/2013 | Kumar et al. ................ 713/323 |
| 2013/0339572 | A1* | 12/2013 | Fanning et al. .............. 711/102 |

OTHER PUBLICATIONS

PCT International Search Report dated Aug. 22, 2012 for PCT Application No. PCT/US2011/064687, filed Dec. 13, 2011, 3 pages.

PCT Written Opinion of the International Searching Authority dated Aug. 22, 2012 for PCT Application No. PCT/US2011/064687, filed Dec. 13, 2011, 4 pages Lee et al., "Architecting Phase Change Memory as a Scalable DRAM Alternative", ISCA '09, Jun. 20, 2009, 12 pgs., Austin, Texas, USA.

Condit et al., "Better I/O Through Byte-Addressable, Persistent Memory", SOSP '09, Oct. 11, 2009, pp. 133-146. Big Sky, Montana, USA.

Freitas et al., "Storage-class memory: The next storage system technology", IBM J. Res. & Dev., Jul./Sep. 2008, pp. 439-447, vol. 52, No. 4/5.

Akel et al., "Onyx: A Prototype Phase Change Memory Storage Array",www.flashmemorysummit.com/... /Proceeding_2011/08/11_S301_Akel.pdf, 5 pgs.

Mearian, "IBM announces computer memory breakthrough Phase-change memory offers 100 times the write performance of NAND flash", Jun. 30, 2011, 3 pgs.

Caulfield et al., "Moneta: A High-performance Storage Array Architecture for Next-generation, Non-volatile Memories", MICRO 43: Proceedings of the 43rd Annual IEEE/ACM International Symposium on Microarchitecture, Atlanta, GA Dec. 2010 pp. 385-395.

"The Non-Volatile Systems Laboratory Coding for non-volatile memories", http://nvsl.ucsd.edu/ecc, printed Sep. 1, 2011. 2 pgs.

"The Non-Volatile Systems Laboratory Moneta and Onyx: Very Fast SS", http://nvsl.ucsd.edu/moneta/, 3 pgs., Sep. 1, 2011.

"The Non-Volatile Systems Laboratory NV-Heaps: Fast and Safe Persistent Objects", http://nvsl.ucsd.edu/nvuheaps/, 2 pgs., Sep. 1, 2011.

"Phase change memory-based 'moneta' system points to the future of computer storage", ScienceBlog, Jun. 2, 2011, 7 pgs.

Quereshi et al., "Scalable High Performance Main Memory System Using Phase-Change Memory Technology", ISCA '09, Jun. 20, 2009, 10 pgs., Austin, Texas, USA.

Kant, Dr. Krishna, "Exploiting NVRAM for Building Multi-Level Memory Systems", International Workshop on Operating System Technologies for Large Scale NVRAM, Oct. 21, 2008, Jeju, Korea, 19 pages.

Bailey et al., "Operating System Implications of Fast, Cheap, Non-Volatile Memory" 13th USENIX, HOTOS11 2011, May 9-11, 2011, 5 pgs.

Raoux et al., "Phase-change random access memory: A scalable technology", IBM J. Res. & Dev., Jul./Sep. 2008, pp. 465-479, vol. 52, No. 4/5.

Chen et al, "Rethinking Database Algorithms for Phase Change Memory", 5th Biennial Conference on Innovative Data Systems Research (CIDR '11), Jan. 9, 2011, 11 pgs., Asilomar, California, USA.

Jacob et al., "The Memory System You Can't Avoid It, You Can't Ignore It, You Can't Fake It", 2009, 77 pgs., Morgan & Claypool.

Mogul et al., "Operating System Support for NVM+DRAM Hybrid Main Memory", 12th Workshop on Hot Topics in operating Systems (HatOS XII), May 18, 2009, 9 pgs.

Wu, et al., "eNVy: A Non-Volatile, Main Memory Storage System" 1994 ACM., ASPLOS VI. pp. 86-97.

Dhiman, et al. "PDRAM: A Hybrid PRAM and DRAM Main Memory System", Jul. 26, 2009, Department of Computer Science and Engineering, 6 pages.

* cited by examiner

METHOD AND SYSTEM FOR PROVIDING INSTANT RESPONSES TO SLEEP STATE TRANSITIONS WITH NON-VOLATILE RANDOM ACCESS MEMORY

CROSS-REFERENCE TO RELATED APPLICATION

This patent application is a U.S. National Phase Application under 35 U.S.C. § 371 of International Application No. PCT/US2011/064687, filed Dec. 13, 2011, entitled A METHOD AND SYSTEM FOR PROVIDING INSTANT RESPONSES TO SLEEP STATE TRANSITIONS WITH NON-VOLATILE RANDOM ACCESS MEMORY.

BACKGROUND

Field of the Invention

Embodiments of the invention relate generally to the field of computer systems. More particularly, embodiments of the invention relate to the improvement of the responsiveness of sleep state transitions using non-volatile random access memory.

Description of the Related Art

A. Current Memory and Storage Configurations

One of the limiting factors for computer innovation today is memory and storage technology. In conventional computer systems, system memory (also known as main memory, primary memory, executable memory) is typically implemented by dynamic random access memory (DRAM). DRAM-based memory consumes power even when no memory reads or writes occur because it constantly recharges internal capacitors. DRAM-based memory is volatile, which means data stored in DRAM memory is lost once the power is removed.

For many computer systems, especially mobile platforms, power utilization is a critical issue in terms of cost and performance. Generally, users have higher expectations on modern platforms with respect to immediate user-perceived responses to ON transitions, application starts, etc., in addition to a long-lasting battery life. To implement instant responsiveness, these platforms keep application state active in fast volatile DRAM, while maintaining the power on the DRAM even when the system is unused. DRAM power is a significant drain on battery life. Thus, many conventional platforms have to reduce the memory capacity in order to prolong its battery life.

B. Phase-Change Memory (PCM) and Related Technologies

Phase-change memory (PCM), also sometimes referred to as phase change random access memory (PRAM or PCRAM), PCME, Ovonic Unified Memory, or Chalcogenide RAM (C-RAM), is a type of non-volatile computer memory which exploits the unique behavior of chalcogenide glass. As a result of heat produced by the passage of an electric current, chalcogenide glass can be switched between two states: crystalline and amorphous. Recent versions of PCM can achieve two additional distinct states, effectively doubling memory storage capacity.

PCM provides higher performance than flash because the memory element of PCM can be switched more quickly, writing (changing individual bits to either 1 or 0) can be done without the need to first erase an entire block of cells, and degradation from writes is slower (a PCM device may survive approximately 100 million write cycles; PCM degradation is due to thermal expansion during programming, metal (and other material) migration, and other mechanisms).

BRIEF DESCRIPTION OF THE DRAWINGS

The following description and accompanying drawings are used to illustrate embodiments of the invention. In the drawings.

DETAILED DESCRIPTION

Figure 1:
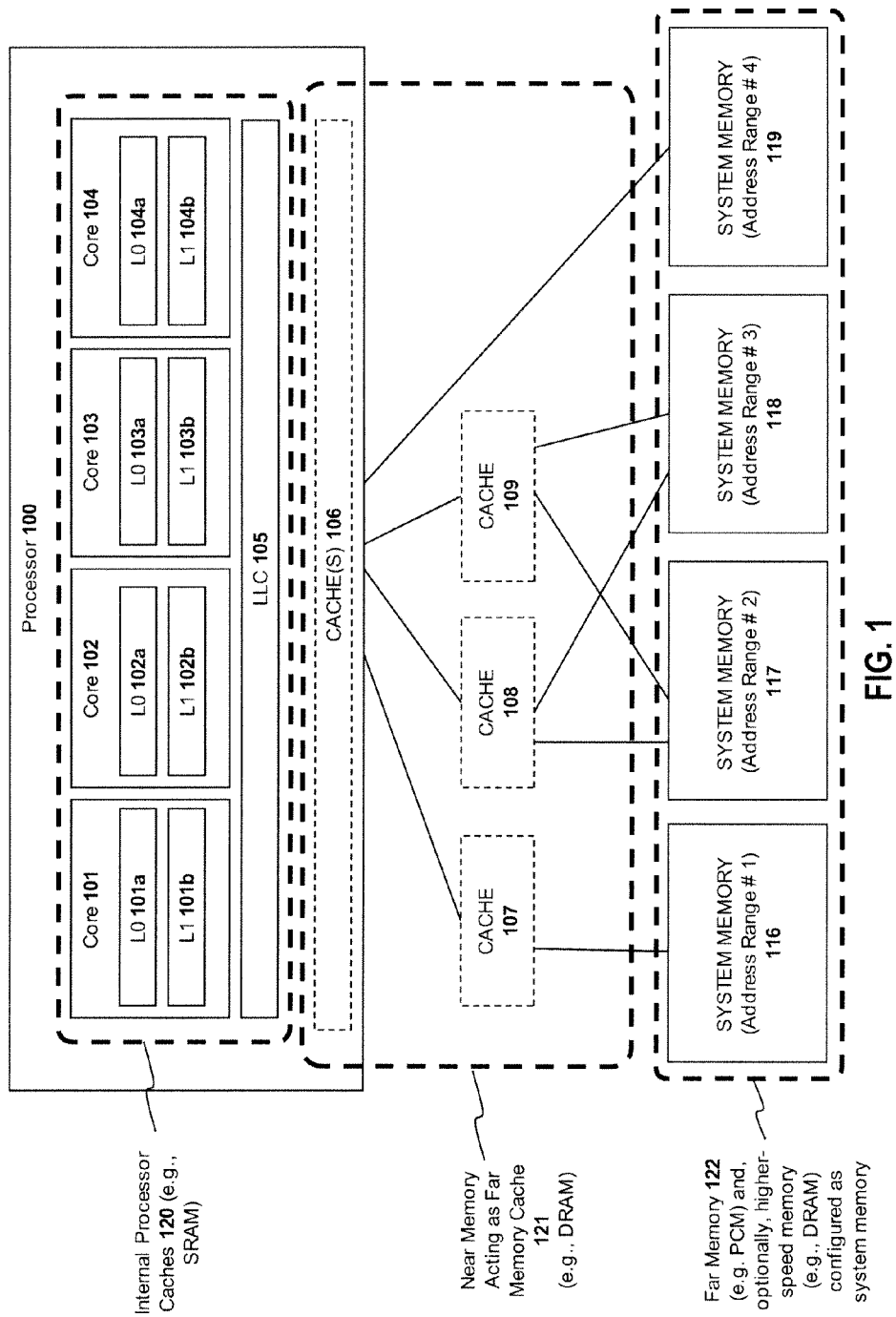
FIG. 1 illustrates a cache and system memory arrangement according to embodiments of the invention.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Bracketed text and blocks with dashed borders (e.g., large dashes, small dashes, dot-dash, dots) are sometimes used herein to illustrate optional operations/components that add additional features to embodiments of the invention. However, such notation should not be taken to mean that these are the only options or optional operations/components, and/or that blocks with solid borders are not optional in certain embodiments of the invention.

Introduction

With an increasing number of processor cores and new usage models (such as virtualization), the capacity requirement and performance requirement on memory continue to grow. In addition, memory power and cost have become a significant component of the overall power and cost of electronic systems (e.g., computer systems).

Embodiments of the invention provide a computer system with instant responsiveness and reduced power consumption. In some embodiments, the performance requirement and the capacity requirement on memory are subdivided between at least two memory technologies. Such a subdivision provides performance with a relatively small amount of a relatively higher-speed memory such as DRAM, while implementing the bulk of the system memory using significantly cheaper and denser non-volatile random access memory (NVRAM), such as Phase Change memory (PCM) or related memory technologies. Embodiments of the invention described below use the NVRAM to allow a platform (e.g., a mobile platform) to be turned on very quickly, and to have a very long battery life. In particular, embodiments of the invention minimize the role of volatile memory in the sleep states defined according to Advanced Configuration and Power Interface (ACPI) specification rev. 4.0a. According to the definition of ACPI specification, the power to DRAM remains on in S3 as well as S1, S2 and S0ix, and the power to DRAM is removed (i.e., turned off) in S4 and S5. In the following descriptions, the sleep states in which DRAM power remains on according to the definitions in the ACPI specification are referred to as "powered sleep states." The sleep states in which DRAM power is turned off according to the definitions in the ACPI specification are referred to as "powered-off sleep states." Embodiments of the invention eliminate DRAM power consumption in the powered sleep states by converting a powered sleep state into a powered-off sleep state prior to a sleep state transition. Embodiments of the invention also provide instant responsiveness on wakeup by allowing the platform to resume operation from a resume vector defined for the powered sleep state. Embodiments of the invention can be applied to all platform configurations where NVRAM is used as the system memory or part of the system memory. In one embodiment, the NVRAM system memory can be used in conjunction with a DRAM memory-side cache. In an alternative embodiment, NVRAM and DRAM in combination can form the system memory. In yet another alternative embodiment, NVRAM alone can be used as the system memory without the presence of DRAM.

FIG. 1 illustrates a cache and system memory arrangement according to embodiments of the invention. Specifically, FIG. 1 shows a memory hierarchy including a set of internal processor caches 120, "near memory" acting as a far memory cache 121, which may include both internal cache(s) 106 and external caches 107-109, and "far memory" 122. One particular type of memory which may be used for "far memory" in some embodiments of the invention is NVRAM. As such, an overview of NVRAM is provided below, followed by an overview of far memory and near memory.

A. Non-Volatile Random Access Memory ("NVRAM")

There are many possible technology choices for NVRAM, including PCM, Phase Change Memory and Switch (PCMS) (the latter being a more specific implementation of the former), byte-addressable persistent memory (BPRAM), storage class memory (SCM), universal memory, Ge2Sb2Te5, programmable metallization cell (PMC), resistive memory (RRAM), RESET (amorphous) cell, SET (crystalline) cell, PCME, Ovshinsky memory, ferroelectric memory (also known as polymer memory and poly(N-vinylcarbazole)), ferromagnetic memory (also known as Spintronics, SPRAM (spin-transfer torque RAM), STRAM (spin tunneling RAM), magnetoresistive memory, magnetic memory, magnetic random access memory (MRAM)), and Semiconductor-oxide-nitride-oxide-semiconductor (SONOS, also known as dielectric memory).

NVRAM has the following characteristics:

(1) It maintains its content even if power is removed, similar to flash memory used in solid state disks (SSD), and different from SRAM and DRAM which are volatile;
(2) lower power consumption than volatile memories such as SRAM and DRAM;
(3) random access similar to SRAM and DRAM (also known as randomly addressable);
(4) rewritable and erasable at a lower level of granularity (e.g., byte level) than flash found in SSDs (which can only be rewritten and erased a "block" at a time—minimally 64 Kbyte in size for NOR flash and 16 Kbyte for NAND flash);
(5) used as a system memory and allocated all or a portion of the system memory address space;
(6) capable of being coupled to the processor over a bus using a transactional protocol (a protocol that supports transaction identifiers (IDs) to distinguish different transactions so that those transactions can complete out-of-order) and allowing access at a level of granularity small enough to support operation of the NVRAM as system memory (e.g., cache line size such as 64 or 128 byte). For example, the bus may be a memory bus (e.g., a DDR bus such as DDR3, DDR4, etc.) over which is run a transactional protocol as opposed to the non-transactional protocol that is normally used. As another example, the bus may be one over which is normally run a transactional protocol (a native transactional protocol), such as a PCI express (PCIE) bus, desktop management interface (DMI) bus, or any other type of bus utilizing a transactional protocol and a small enough transaction payload size (e.g., cache line size such as 64 or 128 byte); and
(7) one or more of the following:
　a) faster write speed than non-volatile memory/storage technologies such as flash;
　b) very high read speed (faster than flash and near or equivalent to DRAM read speeds);
　c) directly writable (rather than requiring erasing (overwriting with 1 s) before writing data like flash memory used in SSDs); and/or
　d) a greater number of writes before failure (more than boot ROM and flash used in SSDs).

As mentioned above, in contrast to flash memory, which must be rewritten and erased a complete "block" at a time, the level of granularity at which NVRAM is accessed in any given implementation may depend on the particular memory controller and the particular memory bus or other type of bus to which the NVRAM is coupled. For example, in some implementations where NVRAM is used as system memory, the NVRAM may be accessed at the granularity of a cache line (e.g., a 64-byte or 128-Byte cache line), notwithstanding an inherent ability to be accessed at the granularity of a byte, because cache line is the level at which the memory subsystem accesses memory. Thus, when NVRAM is deployed within a memory subsystem, it may be accessed at the same level of granularity as the DRAM (e.g., the "near memory") used in the same memory subsystem. Even so, the level of granularity of access to the NVRAM by the memory controller and memory bus or other type of bus is smaller than that of the block size used by flash and the access size of the I/O subsystem's controller and bus.

NVRAM may also incorporate wear leveling algorithms to account for the fact that the storage cells at the far memory level begin to wear out after a number of write accesses, especially where a significant number of writes may occur such as in a system memory implementation. Since high cycle count blocks are most likely to wear out in this manner, wear leveling spreads writes across the far memory cells by swapping addresses of high cycle count blocks with low cycle count blocks. Note that most address swapping is typically transparent to application programs because it is handled by hardware, lower-level software (e.g., a low level driver or operating system), or a combination of the two.

B. Far Memory

The far memory 122 of some embodiments of the invention is implemented with NVRAM, but is not necessarily limited to any particular memory technology. Far memory 122 is distinguishable from other instruction and data memory/storage technologies in terms of its characteristics and/or its application in the memory/storage hierarchy. For example, far memory 122 is different from:

1) static random access memory (SRAM) which may be used for level 0 and level 1 internal processor caches 101a-b, 102a-b, 103a-b, 103a-b, and 104a-b dedicated to each of the processor cores 101-104, respectively, and lower level cache (LLC) 105 shared by the processor cores;

2) dynamic random access memory (DRAM) configured as a cache 106 internal to the processor 100 (e.g., on the same die as the processor 100) and/or configured as one or more caches 107-109 external to the processor (e.g., in the same or a different package from the processor 100); and 3) flash memory/magnetic disk/optical disc applied as mass storage (not shown); and memory such as flash memory or other read only memory (ROM) applied as firmware memory (which can refer to boot ROM, BIOS flash, and/or Trust Platform Module (TPM) flash) (not shown).

Far memory 122 may be used as instruction and data storage that is directly addressable by a processor 100 and is able to sufficiently keep pace with the processor 100 in contrast to flash/magnetic disk/optical disc applied as mass storage. Moreover, as discussed above and described in detail below, far memory 122 may be placed on a memory bus and may communicate directly with a memory controller that, in turn, communicates directly with the processor 100.

Far memory 122 may be combined with other instruction and data storage technologies (e.g., DRAM) to form hybrid memories (also known as Co-locating PCM and DRAM; first level memory and second level memory; FLAM (flash and DRAM)). Note that at least some of the above technologies, including PCM/PCMS may be used for mass storage instead of, or in addition to, system memory, and need not be random accessible, byte addressable or directly addressable by the processor when applied in this manner.

For convenience of explanation, most of the remainder of the application will refer to "NVRAM" or, more specifically, "PCM," or "PCMS" as the technology selection for the far memory 122. As such, the terms NVRAM, PCM, PCMS, and far memory may be used interchangeably in the following discussion. However it should be realized, as discussed above, that different technologies may also be utilized for far memory. Also, that NVRAM is not limited for use as far memory.

C. Near Memory

"Near memory" 121 is an intermediate level of memory configured in front of a far memory 122 that has lower read/write access latency relative to far memory and/or more symmetric read/write access latency (i.e., having read times which are roughly equivalent to write times). In some embodiments, the near memory 121 has significantly lower write latency than the far memory 122 but similar (e.g., slightly lower or equal) read latency; for instance the near memory 121 may be a volatile memory such as volatile random access memory (VRAM) and may comprise a DRAM or other high speed capacitor-based memory. Note, however, that the underlying principles of the invention are not limited to these specific memory types. Additionally, the near memory 121 may have a relatively lower density and/or may be more expensive to manufacture than the far memory 122.

In one embodiment, near memory 121 is configured between the far memory 122 and the internal processor caches 120. In some of the embodiments described below, near memory 121 is configured as one or more memory-side caches (MSCs) 107-109 to mask the performance and/or usage limitations of the far memory including, for example, read/write latency limitations and memory degradation limitations. In these implementations, the combination of the MSC 107-109 and far memory 122 operates at a performance level which approximates, is equivalent or exceeds a system which uses only DRAM as system memory. As discussed in detail below, although shown as a "cache" in FIG. 1, the near memory 121 may include modes in which it performs other roles (e.g., as part of the system memory), either in addition to, or in lieu of, performing the role of a cache.

Near memory 121 can be located on the processor die (as cache(s) 106) and/or located external to the processor die (as caches 107-109) (e.g., on a separate die located on the CPU package, located outside the CPU package with a high bandwidth link to the CPU package, for example, on a memory dual in-line memory module (DIMM), a riser/mezzanine, or a computer motherboard). The near memory 121 may be coupled in communicate with the processor 100 using a single or multiple high bandwidth links, such as DDR or other transactional high bandwidth links (as described in detail below).

An Exemplary System Memory Allocation Scheme

Figure 2:
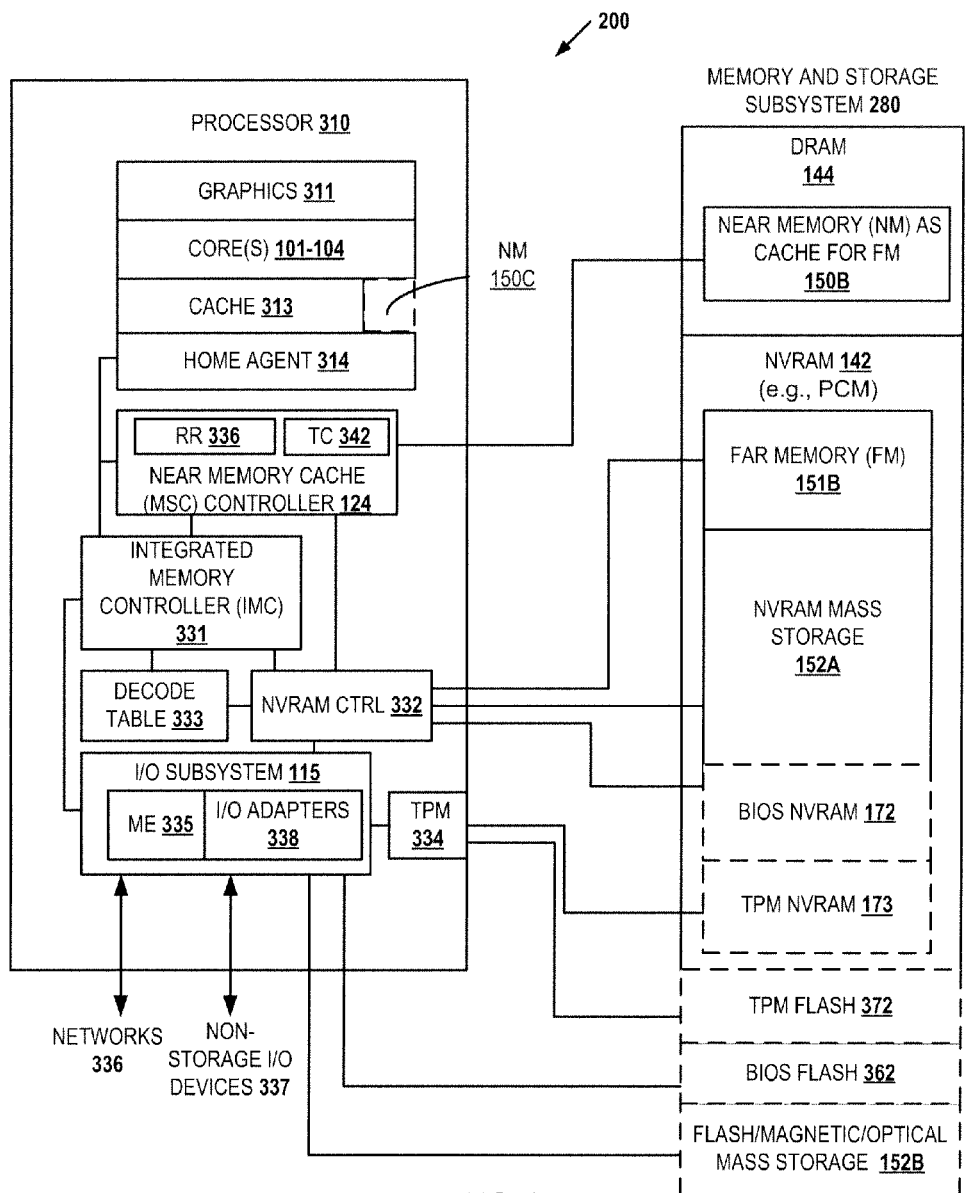
FIG. 2 illustrates a computer system on which embodiments of the invention may be implemented.

FIG. 2 illustrates a computer system 200 on which embodiments of the invention may be implemented. The computer system 200 includes a processor 310 and memory/storage subsystem 280 with a NVRAM 142 used for both system memory, mass storage, and optionally firmware memory. In one embodiment, the NVRAM 142 comprises the entire system memory and storage hierarchy used by computer system 200 for storing data, instructions, states, and other persistent and non-persistent information. As previously discussed, NVRAM 142 can be configured to implement the roles in a typical memory and storage hierarchy of system memory, mass storage, and firmware memory, TPM memory, and the like. In the embodiment of FIG. 2, NVRAM 142 is partitioned into FM 151B, NVRAM mass storage 152A, BIOS NVRAM 172, and TMP NVRAM 173. Storage hierarchies with different roles are also contemplated and the application of NVRAM 142 is not limited to the roles described above.

By way of example, operation while the near memory as cache for FM 150B is in the write-back caching is described. In one embodiment, while the near memory as cache for FM 150B is in the write-back caching mode, a read operation will first arrive at the MSC controller 124 which will perform a look-up to determine if the requested data is present in the near memory acting as a cache for FM 150B (e.g., utilizing a tag cache 342). If present, it will return the data to the requesting CPU, core 101-104 or I/O device through I/O subsystem 115. If the data is not present, the MSC controller 124 will send the request along with the system memory address to an NVRAM controller 332. The NVRAM controller 332 will use the decode table 333 to translate the system memory address to an NVRAM physical device address (PDA) and direct the read operation to this region of the far memory 151B. In one embodiment, the decode table 333 includes an address indirection table (AIT) component which the NVRAM controller 332 uses to translate between system memory addresses and NVRAM PDAs. In one embodiment, the AIT is updated as part of the wear leveling algorithm implemented to distribute memory access operations and thereby reduce wear on the NVRAM FM 151B. Alternatively, the AIT may be a separate table stored within the NVRAM controller 332.

In some embodiments, NVRAM 142 may be the sole memory/storage device off chip (i.e., off the processor chip). In some embodiments, instead of the off-chip DRAM 144, DRAM may be used to provide on-chip as near memory; for example, as NM 150C acting as cache. These embodiments can be specifically relevant to very small platforms (e.g., smartphone or PDA), where multiple memory classes/technologies may be cost prohibitive and more transistors (including storage) can be placed on chip.

Upon receiving the requested data from the NVRAM FM 151B, the NVRAM controller 332 will return the requested data to the MSC controller 124 which will store the data in the MSC near memory acting as an FM cache 150B and also send the data to the requesting processor core 101-104, or I/O device through I/O subsystem 115. Subsequent requests for this data may be serviced directly from the near memory acting as a FM cache 150B until it is replaced by some other NVRAM FM data.

As mentioned, in one embodiment, a memory write operation also first goes to the MSC controller 124 which writes it into the MSC near memory acting as a FM cache 150B. In write-back caching mode, the data may not be sent directly to the NVRAM FM 151B when a write operation is received. For example, the data may be sent to the NVRAM FM 151B only when the location in the MSC near memory acting as a FM cache 150B in which the data is stored must be re-used for storing data for a different system memory address. When this happens, the MSC controller 124 notices that the data is not current in NVRAM FM 151B and will thus retrieve it from near memory acting as a FM cache 150B and send it to the NVRAM controller 332. The NVRAM controller 332 looks up the PDA for the system memory address and then writes the data to the NVRAM FM 151B.

In FIG. 2, NVRAM controller 332 is shown connected to FM 151B, NVRAM mass storage 152A, and BIOS NVRAM 172 using three separate lines. This does not necessarily mean, however, that there are three separate physical buses or communication channels connecting NVRAM controller 332 to these portions of NVRAM 142. Rather, in some embodiments, a common memory bus or other type of bus is used to communicatively couple NVRAM controller 332 to FM 151B, NVRAM mass storage 152A, and BIOS NVRAM 172. For example, in one embodiment, the three lines in FIG. 2 represent a bus, such as a memory bus (e.g., a DDR3, DDR4, etc, bus), over which NVRAM controller 332 implements a transactional protocol to communicate with the NVRAM 142. NVRAM controller 332 may also communicate with NVRAM 142 over a bus supporting a native transactional protocol such as a PCI express bus, desktop management interface (DMI) bus, or any other type of bus utilizing a transactional protocol and a small enough transaction payload size (e.g., cache line size such as 64 or 128 byte).

In one embodiment, computer system 200 includes integrated memory controller (IMC) 331 which performs the central memory access control for processor 310, which is coupled to: 1) a memory-side cache (MSC) controller 124 to control access to near memory (NM) acting as a far memory cache 150B; and 2) a NVRAM controller 332 to control access to NVRAM 142. Although illustrated as separate units in FIG. 2, MSC controller 124 and NVRAM controller 332 may logically form part of IMC 331.

In the illustrated embodiment, MSC controller 124 includes a set of range registers 336 which specify the mode of operation in use for the NM acting as a far memory cache 150B (e.g., write-back caching mode, near memory bypass mode, etc). In the illustrated embodiment, DRAM 144 is used as the memory technology for the NM acting as cache for far memory 150B. In response to a memory access request, MSC controller 124 may determine (depending on the mode of operation specified in the range registers 336) whether the request can be serviced from the NM acting as cache for FM 150B or whether the request must be sent to NVRAM controller 332, which may then service the request from the far memory (FM) portion 151B of NVRAM 142.

In an embodiment where NVRAM 142 is implemented with PCMS, NVRAM controller 332 is a PCMS controller that performs access with protocols consistent with the PCMS technology. As previously discussed, the PCMS memory is inherently capable of being accessed at the granularity of a byte. Nonetheless, NVRAM controller 332 may access a PCMS-based far memory 151B at a lower level of granularity such as a cache line (e.g., a 64-bit or 128-bit cache line) or any other level of granularity consistent with the memory subsystem. The underlying principles of the invention are not limited to any particular level of granularity for accessing a PCMS-based far memory 151B. In general, however, when PCMS-based far memory 151B is used to form part of the system address space, the level of granularity will be higher than that traditionally used for other non-volatile storage technologies such as flash, which can only perform rewrite and erase operations at the level of a "block" (minimally 64 Kbyte in size for NOR flash and 16 Kbyte for NAND flash).

In the illustrated embodiment, NVRAM controller 332 can read configuration data to establish the previously described modes, sizes, etc. for the NVRAM 142 from decode table 333, or alternatively, can rely on the decoding results passed from IMC 331 and I/O subsystem 315. For example, at either manufacturing time or in the field, computer system 200 can program decode table 333 to mark different regions of NVRAM 142 as system memory, mass storage exposed via SATA interfaces, mass storage exposed via USB Bulk Only Transport (BOT) interfaces, encrypted storage that supports TPM storage, among others. The means by which access is steered to different partitions of NVRAM device 142 is via a decode logic. For example, in one embodiment, the address range of each partition is defined in decode table 333. In one embodiment, when IMC 331 receives an access request, the target address of the request is decoded to reveal whether the request is directed toward memory, NVRAM mass storage, or I/O. If it is a memory request, IMC 331 and/or the MSC controller 124 further determines from the target address whether the request is directed to NM as cache for FM 150E or to FM 151B. For FM 151B access, the request is forwarded to NVRAM controller 332. IMC 331 passes the request to I/O subsystem 115 if this request is directed to I/O (e.g., non-storage and storage I/O devices). I/O subsystem 115 further decodes the address to determine whether the address points to NVRAM mass storage 152A, BIOS NVRAM 172, or other non-storage or storage I/O devices. If this address points to NVRAM mass storage 152A or BIOS NVRAM 172, I/O subsystem 115 forwards the request to NVRAM controller 332. If this address points to TMP NVRAM 173, I/O subsystem 115 passes the request to TPM 334 to perform secured access.

In one embodiment, each request forwarded to NVRAM controller 332 is accompanied with an attribute (also known as a "transaction type") to indicate the type of access. In one embodiment, NVRAM controller 332 may emulate the access protocol for the requested access type, such that the rest of the platform remains unaware of the multiple roles performed by NVRAM 142 in the memory and storage hierarchy. In alternative embodiments, NVRAM controller 332 may perform memory access to NVRAM 142 regardless of which transaction type it is. It is understood that the decode path can be different from what is described above. For example, IMC 331 may decode the target address of an access request and determine whether it is directed to NVRAM 142. If it is directed to NVRAM 142, IMC 331 generates an attribute according to decode table 333. Based on the attribute, IMC 331 then forwards the request to appropriate downstream logic (e.g., NVRAM controller 332 and I/O subsystem 315) to perform the requested data access. In yet another embodiment, NVRAM controller 332 may decode the target address if the corresponding attribute is not passed on from the upstream logic (e.g., IMC 331 and I/O subsystem 315). Other decode paths may also be implemented.

The presence of a new memory architecture such as described herein provides for a wealth of new possibilities. Although discussed at much greater length further below, some of these possibilities are quickly highlighted immediately below.

According to one possible implementation, NVRAM 142 acts as a total replacement or supplement for traditional DRAM technology in system memory. In one embodiment, NVRAM 142 represents the introduction of a second-level system memory (e.g., the system memory may be viewed as having a first level system memory comprising near memory as cache 150E (part of DRAM 144) and a second level system memory comprising far memory (FM) 151B (part of NVRAM 142).

According to some embodiments, NVRAM 142 acts as a total replacement or supplement for flash/magnetic/optical mass storage 152B. As previously described, in some embodiments, even though NVRAM 152A is capable of byte-level addressability, NVRAM controller 332 may still access NVRAM mass storage 152A in blocks of multiple bytes, depending on the implementation (e.g., 64 Kbytes, 128 Kbytes, etc.). The specific manner in which data is accessed from NVRAM mass storage 152A by NVRAM controller 332 may be transparent to software executed by processor 310. For example, even through NVRAM mass storage 152A may be accessed differently from flash/magnetic/optical mass storage 152A, the operating system may still view NVRAM mass storage 152A as a standard mass storage device (e.g., a serial ATA hard drive or other standard form of mass storage device).

In an embodiment where NVRAM mass storage 152A acts as a total replacement for flash/magnetic/optical mass storage 152B, it is not necessary to use storage drivers for block-addressable storage access. The removal of storage driver overhead from storage access can increase access speed and save power. In alternative embodiments where it is desired that NVRAM mass storage 152A appears to the OS and/or applications as block-accessible and indistinguishable from flash/magnetic/optical mass storage 152B, emulated storage drivers can be used to expose block-accessible interfaces (e.g., Universal Serial Bus (USB) Bulk-Only Transfer (BOT), 1.0; Serial Advanced Technology Attachment (SATA), 3.0; and the like) to the software for accessing NVRAM mass storage 152A.

In one embodiment, NVRAM 142 acts as a total replacement or supplement for firmware memory such as BIOS flash 362 and TPM flash 372 (illustrated with dotted lines in FIG. 2 to indicate that they are optional). For example, NVRAM 142 may include a BIOS NVRAM 172 portion to supplement or replace BIOS flash 362 and may include a TPM NVRAM 173 portion to supplement or replace TPM flash 372. Firmware memory can also store system persistent states used by a TPM 334 to protect sensitive system information (e.g., encryption keys). In one embodiment, the use of NVRAM 142 for firmware memory removes the need for third party flash parts to store code and data that are critical to the system operations.

Continuing then with a discussion of the system of FIG. 2, in some embodiments, the architecture of computer system 200 may include multiple processors, although a single processor 310 is illustrated in FIG. 2 for simplicity. Processor 310 may be any type of data processor including a general purpose or special purpose central processing unit (CPU), an application-specific integrated circuit (ASIC) or a digital signal processor (DSP). For example, processor 310 may be a general-purpose processor, such as a Core™ i3, i5, i7, 2 Duo and Quad, Xeon™, or Itanium™ processor, all of which are available from Intel Corporation, of Santa Clara, Calif. Alternatively, processor 310 may be from another company, such as ARM Holdings, Ltd, of Sunnyvale, Calif., MIPS Technologies of Sunnyvale, Calif., etc. Processor 310 may be a special-purpose processor, such as, for example, a network or communication processor, compression engine, graphics processor, co-processor, embedded processor, or the like. Processor 310 may be implemented on one or more chips included within one or more packages. Processor 310 may be a part of and/or may be implemented on one or more substrates using any of a number of process technologies, such as, for example, BiCMOS, CMOS, or NMOS. In the embodiment shown in FIG. 2, processor 310 has a system-on-a-chip (SOC) configuration.

In one embodiment, processor 310 includes an integrated graphics unit 311 which includes logic for executing graphics commands such as 3D or 2D graphics commands. While the embodiments of the invention are not limited to any particular integrated graphics unit 311, in one embodiment, graphics unit 311 is capable of executing industry standard graphics commands such as those specified by the Open GL and/or Direct X application programming interfaces (APIs) (e.g., OpenGL 4.1 and Direct X 11).

Processor 310 may also include one or more cores 101-104, although a single core is illustrated in FIG. 2, again, for the sake of clarity. In many embodiments, the core(s) 101-104 includes internal functional blocks such as one or more execution units, retirement units, a set of general purpose and specific registers, etc. If the core(s) are multi-threaded or hyper-threaded, then each hardware thread may be considered as a "logical" core as well. The cores 101-104 may be homogenous or heterogeneous in terms of architecture and/or instruction set. For example, some of the cores may be in order while others are out-of-order. As another example, two or more of the cores may be capable of executing the same instruction set, while others may be capable of executing only a subset of that instruction set or a different instruction set.

Processor 310 may also include one or more caches, such as cache 313 which may be implemented as a SRAM and/or a DRAM. In many embodiments that are not shown, additional caches other than cache 313 are implemented so that multiple levels of cache exist between the execution units in the core(s) 101-104 and memory devices 150B and 151B. For example, the set of shared cache units may include an upper-level cache, such as a level 1 (L1) cache, mid-level caches, such as level 2 (L2), level 3 (L3), level 4 (L4), or other levels of cache, an (LLC), and/or different combinations thereof. In different embodiments, cache 313 may be apportioned in different ways and may be one of many different sizes in different embodiments. For example, cache 313 may be an 8 megabyte (MB) cache, a 16 MB cache, etc. Additionally, in different embodiments the cache may be a direct mapped cache, a fully associative cache, a multi-way set-associative cache, or a cache with another type of mapping. In other embodiments that include multiple cores, cache 313 may include one large portion shared among all cores or may be divided into several separately functional slices (e.g., one slice for each core). Cache 313 may also include one portion shared among all cores and several other portions that are separate functional slices per core. In one embodiment, cache 313 may include DRAM near memory (NM) 150C acting as cache.

Processor 310 may also include a home agent 314 which includes those components coordinating and operating core(s) 101-104. Home agent unit 314 may include, for example, a power control unit (PCU) and a display unit. The PCU may be or include logic and components needed for regulating the power state of the core(s) 101-104 and the integrated graphics unit 311. The display unit is for driving one or more externally connected displays.

As mentioned, in some embodiments, processor 310 includes an integrated memory controller (IMC) 331, near memory cache (MSC) controller, and NVRAM controller 332 all of which can be on the same chip as processor 310, or on a separate chip and/or package connected to processor 310. DRAM 144 may be on the same chip or a different chip as IMC 331 and MSC controller 124; thus, one chip may have processor 310 and DRAM 144; one chip may have the processor 310 and another DRAM 144 and (these chips may be in the same or different packages); one chip may have the core(s) 101-104 and another IMC 331, MSC controller 124 and DRAM 144 (these chips may be in the same or different packages); one chip may have the core(s) 101-104, another the IMC 331 and MSC controller 124, and another DRAM 144 (these chips may be in the same or different packages); etc.

In some embodiments, processor 310 includes an I/O subsystem 115 coupled to IMC 331. I/O subsystem 115 enables communication between processor 310 and the following serial or parallel I/O devices: one or more networks 336 (such as a Local Area Network, Wide Area Network or the Internet), storage I/O device (such as flash/magnetic/optical mass storage 152B, BIOS flash 362, TPM flash 372) and one or more non-storage I/O devices 337 (such as display, keyboard, speaker, and the like). I/O subsystem 115 may include a platform controller hub (PCH) (not shown) that further includes several I/O adapters 338 and other I/O circuitry to provide access to the storage and non-storage I/O devices and networks. To accomplish this, I/O subsystem 115 may have at least one integrated I/O adapter 338 for each I/O protocol utilized. I/O subsystem 115 can be on the same chip as processor 310, or on a separate chip and/or package connected to processor 310.

I/O adapters 338 translate a host communication protocol utilized within the processor 310 to a protocol compatible with particular I/O devices. For flash/magnetic/optical mass storage 152B, some of the protocols that I/O adapters 338 may translate include Peripheral Component Interconnect (PCI)-Express (PCI-E), 3.0; USB, 3.0; SATA, 3.0; Small Computer System Interface (SCSI), Ultra-640; and Institute of Electrical and Electronics Engineers (IEEE) 1394 "Firewire;" among others. For BIOS flash 362, some of the protocols that I/O adapters 338 may translate include Serial Peripheral Interface (SPI), Microwire, among others. Additionally, there may be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

In some embodiments, I/O subsystem 115 is coupled to a TPM control 334 to control access to system persistent states, such as secure data, encryption keys, platform configuration information and the like. In one embodiment, these system persistent states are stored in a TMP NVRAM 173 and accessed via NVRAM controller 332.

In one embodiment, TPM 334 is a secure micro-controller with cryptographic functionalities. TPM 334 has a number of trust-related capabilities; e.g., a SEAL capability for ensuring that data protected by a TPM is only available for the same TPM. TPM 334 can protect data and keys (e.g., secrets) using its encryption capabilities. In one embodiment, TPM 334 has a unique and secret RSA key, which allows it to authenticate hardware devices and platforms. For example, TPM 334 can verify that a system seeking access to data stored in computer system 200 is the expected system. TPM 334 is also capable of reporting the integrity of the platform (e.g., computer system 200). This allows an external resource (e.g., a server on a network) to determine the trustworthiness of the platform but does not prevent access to the platform by the user.

In some embodiments, I/O subsystem 315 also includes a Management Engine (ME) 335, which is a microprocessor that allows a system administrator to monitor, maintain, update, upgrade, and repair computer system 200. In one embodiment, a system administrator can remotely configure computer system 200 by editing the contents of the decode table 333 through ME 335 via networks 336.

For convenience of explanation, the remainder of the application sometimes refers to NVRAM 142 as a PCMS device. A PCMS device includes multi-layered (vertically stacked) PCM cell arrays that are non-volatile, have low power consumption, and are modifiable at the bit level. As such, the terms NVRAM device and PCMS device may be used interchangeably in the following discussion. However it should be realized, as discussed above, that different technologies besides PCMS may also be utilized for NVRAM 142.

It should be understood that a computer system can utilize NVRAM 142 for system memory, mass storage, firmware memory and/or other memory and storage purposes even if the processor of that computer system does not have all of the above-described components of processor 310, or has more components than processor 310.

In the particular embodiment shown in FIG. 2, MSC controller 124 and NVRAM controller 332 are located on the same die or package (referred to as the CPU package) as processor 310. In other embodiments, MSC controller 124 and/or NVRAM controller 332 may be located off-die or off-CPU package, coupled to processor 310 or CPU package over a bus such as a memory bus (like a DDR bus (e.g., a DDR3, DDR4, etc)), a PCI express bus, a desktop management interface (DMI) bus, or any other type of bus. In one embodiment, NVRAM controller 332 can be located on the same physical modules (e.g., cards, risers, mezzanines, dual-in-line memory modules (DIMM), etc.) as NVRAM 142.

Figure 3:
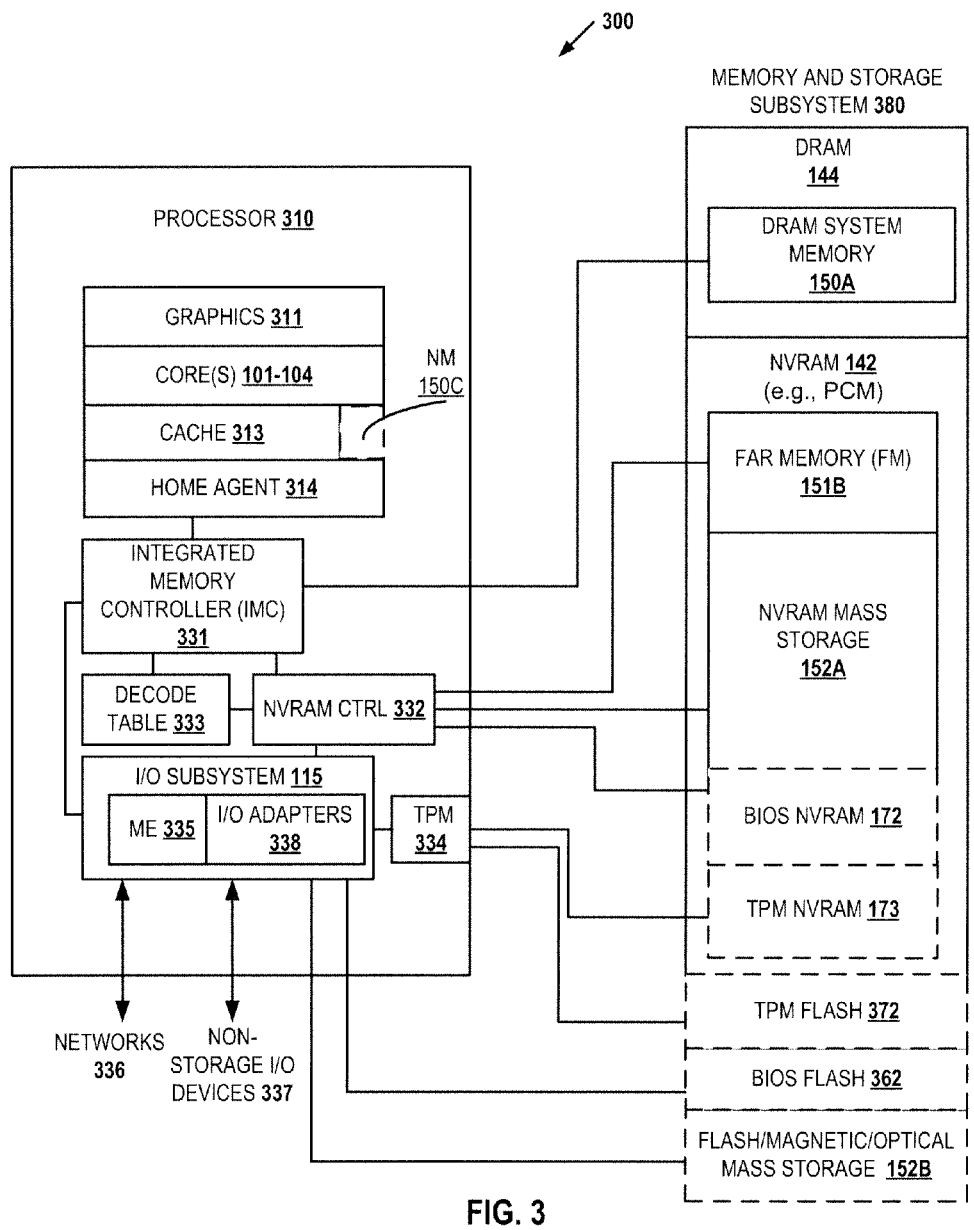
FIG. 3 illustrates an alternative computer system on which embodiments of the invention may be implemented.

In an alternative embodiment of a computer system 300 as shown in the embodiment of FIG. 3, the DRAM 144 operates as part of the system memory (referred to as a "DRAM system memory 150A") instead of a cache. Thus, in the memory and storage subsystem 380 of the computer system 300, the system memory space includes both the DRAM system memory 150A and the NVRAM 142. Instead of having the MSC controller 124 interacting with the DRAM cache 150B (as shown in FIG. 2), this alternative embodiment uses the IMC 331 to directly interact with the DRAM system memory 150A. In some embodiments, in addition to or instead of the DRAM system memory 150A, the DRAM may be used to provide on-chip memory; for example, the NM 150C.

A Power Management Mechanism for Sleep State Transitions

In the following description, a power management mechanism will be described in detail with reference to the computer system 200 of FIG. 2. A variation of this power management mechanism will also be described with reference to the computer system 300 of FIG. 3.

Figures 4A, 4B:
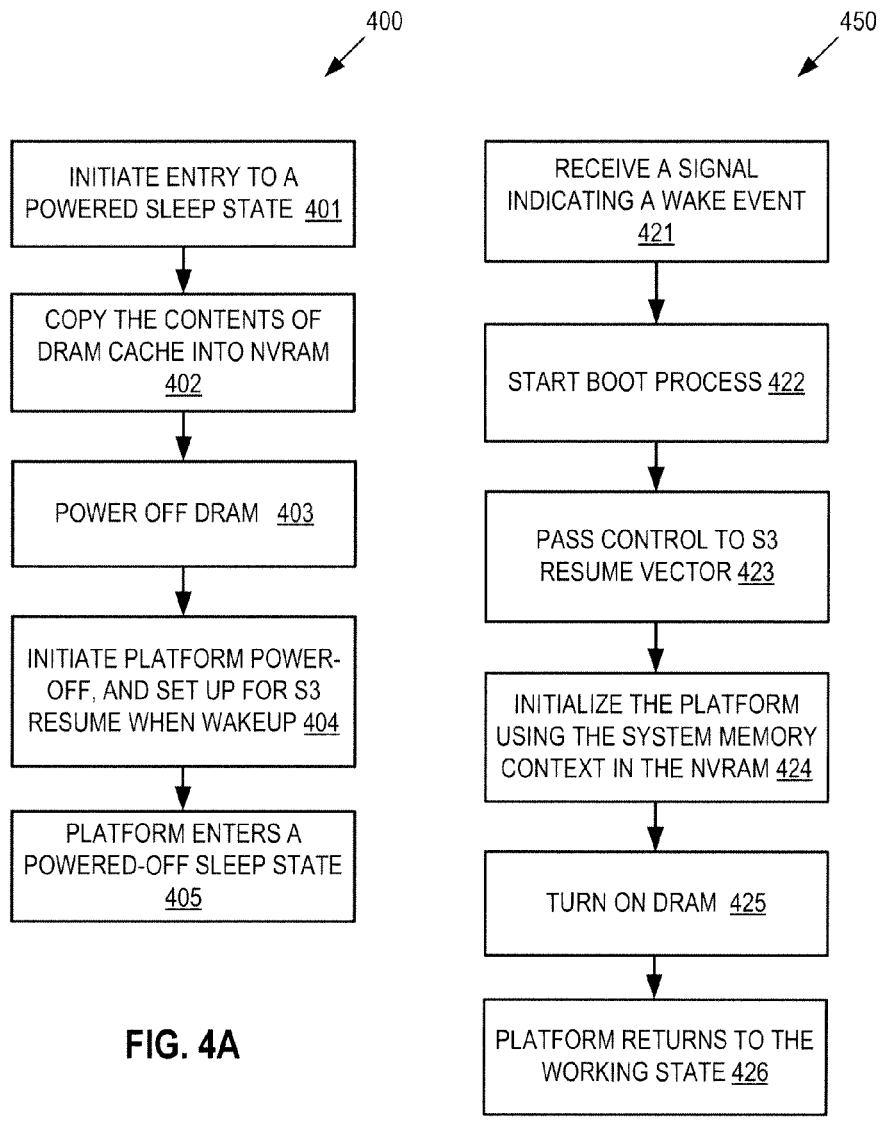
FIG. 4A is a flow diagram illustrating a method of transitioning into a sleep state according to embodiments of the invention.
FIG. 4B is a flow diagram illustrating a method of transitioning out of a sleep state according to embodiments of the invention.

FIG. 4A is a flow diagram illustrating a method 400 of transitioning into a sleep state according one embodiment of the invention. FIG. 4B is a flow diagram illustrating a method 450 of transitioning out of the sleep state according one embodiment of the invention. Referring to the embodiment of FIGS. 2 and 4A, in response to an internally-generated event or an external command, the OS of the computer system 200 (also referred to as the platform 200) initiates the entry to a powered sleep state (e.g., S1, S2, S3, or S0ix) (block 401). In response, the MSC controller 124 flushes (i.e., copies) the contents of the DRAM cache 150E into the NVRAM 142 (block 402), and turns off the power to the DRAM cache 150B (block 403). The processor 210 then executes the BIOS code (which can be stored in the BIOS NVRAM 172) to initialize platform 200 power-off, and to set up an indicator (e.g., a flag, a register, a BIOS/OS interface, or the like) such that the processor 210 can return to and pass control to an S3 resume vector (or another powered sleep state resume vector) upon wakeup (block 404). In one embodiment, the resume vector points to a firmware location (e.g., a location in the NVRAM 142) that stores initialization code executable by the processor 210 upon wakeup. The platform 200 then enters a "powered-off sleep state" (block 405). The "powered-off sleep state" is defined as a sleep state in which the power to the DRAM cache 150B is turned off. The other components of the platform 200, including the MSC controller 124, can also be turned off in this powered-off sleep state. Examples of this powered-off sleep state include, but are not limited to, S4 and S5, as defined in the ACPI specification rev. 4.0a.

With the use of the NVRAM 142, the platform 200 can enter a powered-off sleep state in response to a request for entry into a powered sleep state. The difference in power consumption between the powered sleep state and the powered-off sleep state can be one or two orders of magnitude. On a mobile platform, this power saving can translate into a battery life in standby mode from a few days to a few hundreds of days. Thus, significant power saving can be achieved.

Referring to the embodiment of FIG. 4B, upon receiving a signal indicating a wake event (block 421), the processor 210 begins a boot process and executes the BIOS (block 422). The BIOS initializes the core functions that are necessary to exit the powered sleep state, and passes control to the resume vector (e.g., S3 resume vector) that was set up prior to the entry to the sleep state (block 423). These powered sleep state resume vectors operate in an environment where the system memory context is preserved. Since the contents of the DRAM cache 150B has been copied to the NVRAM 142 prior to the entry to the sleep state, the entire system memory context is preserved in the NVRAM 142. Thus, the platform 200 can quickly resume its working state with the resume vector and using the context preserved in the NVRAM 142.

During the boot process, platform hardware devices (including the MSC controller 124) and OS are also initialized. The OS then boots system software and applications, directly accessing the system memory context in the NVRAM 142 (block 424). The NVRAM 142 can provide nearly as fast response as the DRAM cache 150B, especially with respect to read access. While the OS initializes the rest of the platform 200 using the code and data in the NVRAM 142, the DRAM cache 150B can be turned on and initialized through the MSC controller 124 (block 425). The platform 200 then exits the sleep state and enters a working state (block 526).

The preceding description relates to an embodiment in which the DRAM 144 is used as a memory-side cache. In an alternative embodiment, the DRAM 144 can operate as part of the system memory (referred to as the DRAM system memory 150A of FIG. 3) instead of a cache. To preserve the system memory context, prior to the entry of a powered sleep state, the OS copies the contents of the DRAM system memory 150A into the NVRAM 124. Upon wakeup, the OS directly accesses the NVRAM 124 to initialize software and applications, and turns on and initializes the DRAM system memory 150A at a later time after the initialization has started.

In yet another embodiment, the NVRAM 142 can be used as a total replacement of the DRAM 144. That is, the NVRAM 142 is the system memory and no volatile memory is included as part of the system memory. The NVRAM 142 alone is used for maintaining the system memory context. The sleep state transitions of this embodiment are similar to those described in FIGS. 4A and 4B, except that the MSC controller 124 and the DRAM cache 150B are not needed.

Figure 5:
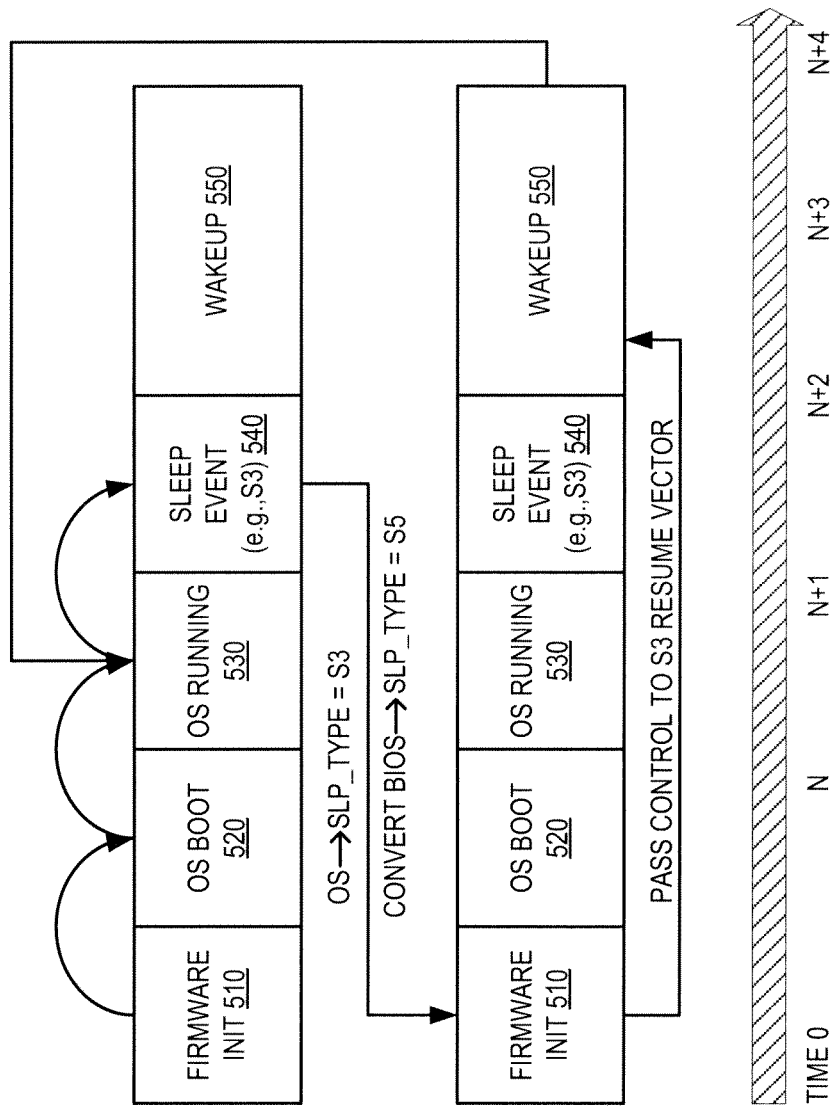
FIG. 5 is a block diagram illustrating a sleep state conversion according to embodiments of the invention.

FIG. 5 is a block diagram illustrating a sleep state conversion according to embodiments of the invention. In the embodiment of FIG. 5, each block 510-550 indicates a stage in the platform transitions. Further, blocks 510-550 are duplicated in FIG. 5 to more clearly show that some stages can be skipped over when the platform enters and exits a powered sleep state. The sleep state conversion of FIG. 5 can be performed by the computer system 200 of FIG. 2, the computer system of FIG. 3, or any alternatives or variations thereof as described above. Although S3 and S5 are used to indicate the powered sleep state and the powered-off sleep state, respectively, it is understood that other powered sleep states and powered-off sleep states can be used.

In the embodiment of FIG. 5, blocks 510-530 indicate the normal platform boot process, including firmware (e.g., BIOS) initialization 510, OS boot 520 and OS running 530 (which represents the working state of the platform). When the platform receives a request to enter a powered sleep state (e.g., S3) at block 540, the OS sets the sleep type (by setting a SLP_TYPE register) to S3. Instead of transitioning into S3, the processor executes the BIOS to transition into a powered-off sleep state (e.g., S5). S5 is also referred to as G2 state or a soft-off state. In S5, the platform powers off all of the devices, including any volatile memory devices (if any). Upon wakeup, the processor executes the BIOS to initialize the boot process at block 510, and passes control to the S3 resume vector to initialize the rest of the platform at block 550. By passing control to the S3 resume vector, the processor executes the firmware code pointed to by the S3 resume vector to retrieve the system memory context from the NVRAM and boot up the software and applications. The platform then returns to the working state.

Figure 6:
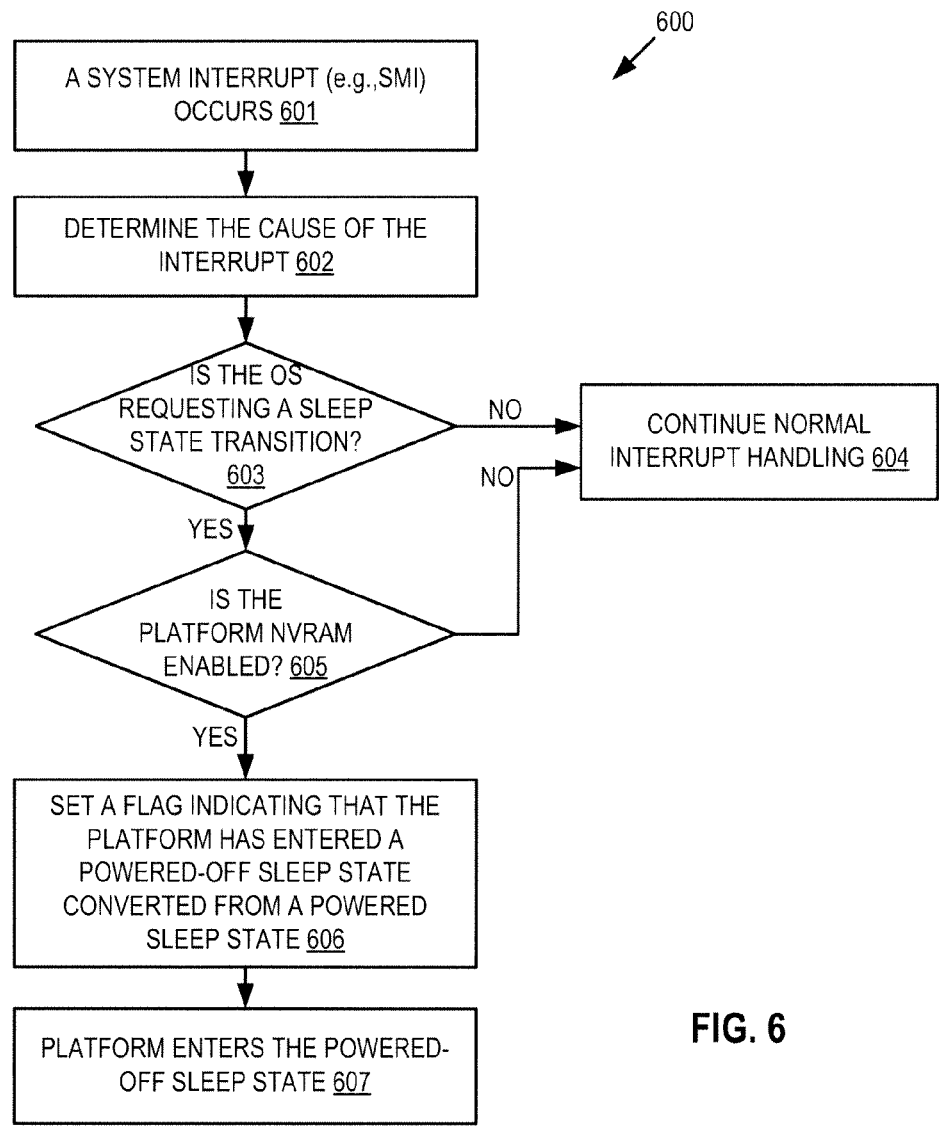
FIG. 6 is a flow diagram illustrating a method of performing a sleep state conversion upon a sleep request according to embodiments of the invention.

FIG. 6 is a flow diagram illustrating a method 600 of performing a sleep state conversion upon a sleep request according one embodiment of the invention. The method 600 can be performed by the computer system 200 of FIG. 2, the computer system of FIG. 3, or alternatives or variation thereof as described above. In this embodiment, the method 600 begins when a system interrupt (e.g., a system management interrupt (SMI)) occurs (block 601). The processor determines whether the interrupt is related to the reliability, availability, and serviceability (RAS) of the platform, or a sleep state requested or induced by the OS (block 602). If it is not the OS requesting a transition into a powered sleep state (e.g., S3) (block 603), the processor continues normal interrupt handling (block 604). If it is the OS requesting a transition into a powered sleep state (e.g., S3), the processor determines whether the platform is enabled with NVRAM (that is, whether the platform includes NVRAM as the system memory) (block 605). If the platform is not enabled with NVRAM, the processor continues normal interrupt handling (block 604). If the platform is enabled with NVRAM, the processor sets a flag indicating that the platform has entered a powered-off sleep state (e.g., S5) that is converted from a powered sleep state (e.g., S3) (block 606). That is, the flag indicates that the NVRAM attributes are being leveraged to turn off the platform. On a platform that includes DRAM (as memory-side cache or a part of the system memory), the method 400 of FIG. 4A can be performed to copy the DRAM contents to the NVRAM. The platform then enters the powered-off sleep state (block 607), in which the power to the platform is turned off.

Figure 7:
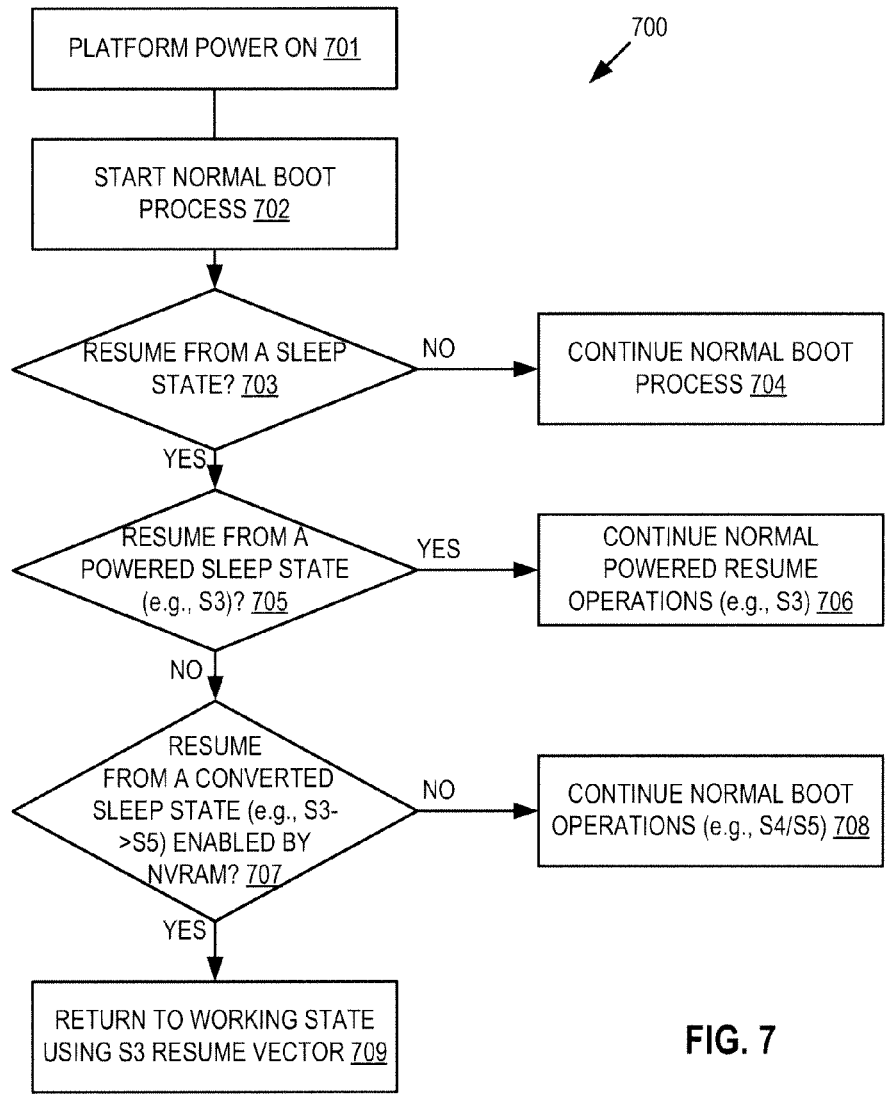
FIG. 7 is a flow diagram illustrating a method of performing a sleep state conversion upon a wake event according to embodiments of the invention.

FIG. 7 is a flow diagram illustrating a method 700 of performing a sleep state conversion upon a wake event according one embodiment of the invention. The method 700 can be performed by the computer system 200 of FIG. 2, the computer system of FIG. 3, or alternatives or variations thereof as described above. In this embodiment, the method 700 begins when the platform is powered on (block 701) and a normal boot process begins (block 702). If the platform is not resuming from a sleep state (block 703) (e.g., by checking whether the sleep state registers SLP_EN and SLP_TYPE are set), the normal boot process continues (block 704). If the platform is resuming from a sleep state, it is further determined whether the platform is resuming from a powered sleep state (e.g., S3) (block 705). If the platform is resuming from a powered sleep state, the boot process continues with the normal resume operations of the powered sleep state (block 706). If the platform is not resuming from a powered sleep state, it is further determined whether the platform is resuming from powered-off sleep state converted from a powered sleep state (e.g., S5 converted from S3), in which the conversion is enabled by NVRAM (block 707). If the platform is not resuming from a converted sleep state enabled by NVRAM, the boot process continues with the normal resume operations of the powered-off sleep state (e.g., S4 or S5) (block 708). If the platform is resuming from a converted sleep state enabled by NVRAM, the execution jumps to the resume vector of the powered sleep state (e.g., S3) to return the platform to the working state (block 709). On a platform that includes DRAM (as cache or part of the system memory), the method 450 of FIG. 4B can be performed to turn on the DRAM.

It should be understood that the operations of the flow diagrams FIGS. 4A, 4B, 6 and 7 can be performed by the embodiment of FIGS. 2 and 3, as well as embodiments other than those shown in these figures. Additionally, the embodiments discussed with reference to FIGS. 2 and 3 can perform different operations than those discussed with reference to the flow diagram of FIGS. 4A, 4B, 6 and 7.

The techniques shown in the flow diagrams of FIGS. 4A, 4B, 6 and 7 can be implemented using instructions and data stored on non-transitory machine-readable or computer-readable media, such as non-transitory machine-readable or computer-readable storage media (e.g., magnetic disks; optical disks; random access memory; read-only memory; flash memory devices; and phase-change memory).

Embodiments of the invention may also be provided as a computer program product which may include a non-transitory machine-readable medium having stored thereon instructions which may be used to program a computer (or other electronic device) to perform a process. The non-transitory machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. Embodiments of the invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method comprising:
receiving a request for a computer system to enter a powered sleep state, the computer system comprising a processor coupled to a non-flash non-volatile random access system memory component, the non-flash non-volatile random access system memory component being accessible by the processor through a system memory interface and without passing through an I/O subsystem of the computer system, the non flash non-volatile random access system memory component being byte-rewritable by the processor, the non flash non-volatile random access memory component to behave as system memory for the computing system during the computer system's normal operating mode, the powered sleep state defined as a state in which power is supplied to volatile random access memory in the computer system;

in response to the request, converting the powered sleep state into a powered-off sleep state with system memory context stored in the non flash non-volatile random access system memory component such that the system memory context remains stored in the non flash non-volatile random access system memory component and is not transferred to a non volatile mass storage component as part of the converting, the powered-off sleep state defined as a state in which power is removed from the volatile random access memory, in response to a wake event, executing BIOS initialization program code from the non flash non-volatile random access system memory component and without loading the BIOS initialization program code into the non flash non-volatile random access system memory component from the non volatile mass storage component between the wake event and the executing, the executing of the BIOS initialization program code resuming working state operations using the system memory context stored in the non flash non-volatile random access system memory component.

2. The method of claim 1, wherein the non flash non-volatile random access system memory component comprises any of:
phase change memory (PCM); programmable metallization cell (PMC); resistive memory;
Ovshinsky memory;
ferroelectric memory;
ferromagnetic memory;
magnetoresistive memory;
magnetic random access memory;
dielectric memory.

3. The method of claim 1, wherein the volatile random access memory comprises dynamic random access memory (DRAM) used as a memory-side cache for the non flash non-volatile random access system memory component.

4. The method of claim 1, wherein the volatile random access memory comprises dynamic random access memory (DRAM) used in combination with the non flash non-volatile random access system memory component as system memory of the computer system.

5. The method of claim 1, further comprising:
setting a flag to indicate that the computer system has entered the powered-off sleep state converted from the powered sleep state.

6. The method of claim 1, further comprising:
prior to transitioning into the powered-off sleep state, setting up a resume vector of the powered sleep state for the processor to return to upon wakeup, wherein the resume vector points to a firmware location that stores BIOS initialization program code.

7. The method of claim 1, wherein the volatile random access memory comprises dynamic random access memory (DRAM), the method further comprising:
upon the wake event, initializing the computer system using the system memory context stored in the non flash non-volatile random access system memory component; and
after the initializing has started, turning on the power to the DRAM.

8. An apparatus comprising:
a processor in a computer system; and
an interface for the processor to communicate to a non flash non-volatile random access system memory component that is accessible to the processor through a system memory interface and without passing through an I/O subsystem of the computer system, the non flash non-volatile random access system memory component being byte-rewritable by the processor, the non flash non-volatile random access memory component to behave as system memory for the computing system during the computer system's normal operating mode;
wherein upon a request for the computer system to enter a powered sleep state, the processor is to convert the powered sleep state into a powered-off sleep state with system memory context stored in the non flash non-volatile random access system memory component such that the system memory context is to remain stored in the non flash non-volatile random access system memory component and is not transferred to a non volatile mass storage component as part of the conversion to the powered-off sleep state, the powered sleep state defined as a state in which power is supplied to volatile random access memory in the computer system and the powered-off sleep state defined as a state in which power is removed from the volatile random access memory; and
wherein upon a wake event, the computer system is to execute BIOS initialization program code from the non flash non-volatile random access system memory component without loading the BIOS initialization program code into the non flash non-volatile random access system memory component from the non volatile mass storage component between the wake event and the executing, the execution of the BIOS initialization program code to resume working state operations using the system memory context stored in the non-volatile random access system memory component.

9. The apparatus of claim 8, wherein the non-volatile random access system memory component comprises any of:
phase change memory (PCM); programmable metallization cell (PMC); resistive memory;
Ovshinsky memory;
ferroelectric memory;
ferromagnetic memory;
magnetoresistive memory;
magnetic random access memory;
dielectric memory.

10. The apparatus of claim 8, wherein the volatile random access memory comprises dynamic random access memory (DRAM) used as a memory-side cache for the non flash non-volatile random access system memory component.

11. The apparatus of claim 10, further comprising:
a memory-side cache controller coupled to the DRAM to control access to the DRAM.

12. The apparatus of claim 8, wherein the volatile random access memory comprises dynamic random access memory (DRAM) used in combination with the non flash non-volatile random access system memory component as system memory of the computer system.

13. The apparatus of claim 8, further comprising:
firmware coupled to the processor, a location of the firmware pointed to by a resume vector of the powered sleep state and stored thereon the BIOS initialization program code, wherein the processor is to set up the resume vector of the powered sleep state for the processor to return to upon wakeup prior to transitioning into the powered-off sleep state.

14. The apparatus of claim 8, wherein the volatile random access memory comprises dynamic random access memory (DRAM), and wherein the processor is to:
initialize the computer system using the system memory context stored in the non flash non-volatile random access system memory component upon the wake event, and turn on the power to the DRAM after the initializing has started.

15. A system comprising:
a processor in a computer system;
a dynamic random access memory (DRAM) coupled to the processor; and
a non flash non-volatile random access system memory component coupled to the processor and accessible by the processor through a system memory interface and without passing through an I/O subsystem of the computer system, the non flash non-volatile random access system memory component being byte-rewritable by the processor, the non flash non-volatile random access memory component to behave as system memory for the computing system during the computer system's normal operating mode;
wherein upon a request for the computer system to enter a powered sleep state, the processor converts the powered sleep state into a powered-off sleep state with system memory context stored in the non flash non-volatile random access system memory component such that the system memory context is to remain stored in the non flash non-volatile random access system memory component and is not transferred to a non volatile mass storage component as part of the conversion to the powered-off sleep state, the powered sleep state defined as a state in which power is supplied to the DRAM and the powered-off sleep state defined as a state in which power is removed from the DRAM, and wherein upon a wake event, the computer system executes BIOS initialization program code from the non flash non-volatile random access system memory component without loading the BIOS initialization program code into the non flash non-volatile random access system memory component from the non volatile mass storage component between the wake event and the execution of the BIOS initialization program code, the execution of the BIOS initialization program code to resume working state operations using the system memory context stored in the non flash non-volatile random access system memory component.

16. The system of claim 15, wherein non flash the non-volatile random access system memory component comprises any of:
phase change memory (PCM); programmable metallization cell (PMC); resistive memory;
Ovshinsky memory;
ferroelectric memory;
ferromagnetic memory;
magnetoresistive memory;
magnetic random access memory;
dielectric memory.

17. The system of claim 15, wherein the DRAM is used as a memory-side cache for the non flash non-volatile random access system memory component.

18. The system of claim 15, wherein the DRAM is used in combination with the non flash non-volatile random access system memory component as system memory of the computer system.

19. The system of claim 15, further comprising:
firmware coupled to the processor, a location of the firmware pointed to by a resume vector of the powered sleep state and stored thereon the BIOS initialization program code, wherein the processor is to set up the resume vector of the powered sleep state for the processor to return to upon wakeup prior to transitioning into the powered-off sleep state.

20. The system of claim 15, wherein the processor is to:
initialize the computer system using the system memory context stored in the non flash non-volatile random access system memory component upon the wake event, and turn on the power to the DRAM after the initializing has started.

* * * * *